UNITED STATES PATENT OFFICE.

EMANUEL NUSSBAUM, OF VIENNA, AUSTRIA-HUNGARY.

METHOD OF PRODUCING ACID ALBUMINATE.

1,005,456. Specification of Letters Patent. Patented Oct. 10, 1911.

No Drawing. Application filed January 24, 1907. Serial No. 353,835.

*To all whom it may concern:*

Be it known that I, EMANUEL NUSSBAUM, a citizen of Austria, residing at Vienna, Austria-Hungary, have invented certain new and useful Improvements in Methods of Producing Acid Albuminate from Albumen and Albuminous Substances of All Kinds, of which the following is a specification.

The production of alkali-albuminates or the solution of albumen in alkali is well known and easily carried out; these alkaline albuminates are comparatively little used in industry. Of much more importance are acid solutions of albumen and there has been a long felt want for a satisfactory method of producing these acid solutions of albumen.

By the method hereinafter described of hydrolyzing albuminous substances it is possible to dissolve the latter, whether of vegetable or animal origin both in organic and inorganic acids, that is to convert them into pure acid albuminates.

The method consists in mixing the albuminous material, whether in a pure state or as contained in the waste products obtained in the manufacture of starch, with very weak acid (such as phosphoric acid), with the addition of mixtures containing yeast and sugar (such as malt), for a suitable length of time at normal temperature, or better, in chambers heated to 30° to 40° centigrade, the whole mass being well stirred every two hours during the first period of fermentation (the first twelve hours) until a thickish uniform liquid is obtained. It is preferable to continue this two-hourly stirring for seventy-two hours and a solution of the albumen entirely free from sediment is obtained. In this method the greater part of the albuminous substances goes into solution and pure liquid acid albuminate can be extracted by filtration from the thickish liquid thus obtained, which albuminate, according to the further purpose for which it is to be used, is either left in this condition or is brought by evaporation to a thicker consistency with a higher percentage of albumen or is evaporated to dryness. It is to be noted that the acid albuminate extracted in this manner is not decomposed even at high temperature and in certain cases not even at the boiling point whereby even the above mentioned possibility of evaporating into the desired consistency is given. Further, it has been found that if the product be mixed with sulfate of ammonium, or sulfate of zinc, albuminous bodies separate out, so that the new product evidently belongs to the group of albuminoses. With this method both pure natural products and also waste or by-products of other manufactures, especially the waste in the manufacture of starch can be used; obviously, in the use of pure raw materials the production of acid albuminate will be greater. For the quantity of acid albuminate obtained the duration of the digesting operation is also a factor. The output will be greater and the process will be more quickly carried out if a higher temperature (30°–40° C.) is used.

For preparing the solution of sugar any solution of sugar-containing material can be used but I prefer the use of malt as the cheapest product. The yeast acts as a ferment and serves to mechanically hinder the albumen particles of great specific weight from depositing, by causing it to be kept longer in suspension and longer in contact with the maximum quantity of solvent. The addition of sugar or of malt serves on the other hand to prolong the duration of the action of the yeast which is fed on the sugar.

In the treatment of vegetable albuminous materials and materials rich in starch as for example pods, rice, chits and the like, these are treated in comminuted condition with the dilute acid in the presence of sugar and yeast and are converted by the solution directly into acid albuminate and starch; the albumen which lies more on the upper surface of the pods goes directly into solution, while the starch remains as a residue and can be put to any further use desired. Especially for the treatment of chits, which on account of the white color of the starch and its great cheapness is in this case a valuable raw material, the described method is of value as it allows the chits to be converted directly into acid albuminate and starch.

The process above described can be used also for treating albuminous materials (waste products) which are separated from the starch by means of alkalis and are afterward neutralized by means of sulfuric acid. Lastly, an example of the method may be given, which, as shown by my experiments, provides the quickest and most abundant supply of acid albuminates:—20 parts of dry albumen (*i. e.* gluten) are digested with 200 parts of a ½% solution of phosphoric acid containing also 5 parts of malt or sugar and 1 part of fresh German yeast, for from three to four days at a temperature of 30° to 40° C. It may be mentioned that a mixture of two or more very dilute acids, for example organic and inorganic acids such as phosphoric acid, can be used if the subsequent application of the acid albuminate makes it advantageous to do so.

My experiments have shown that in general phosphoric acid gives the best result. It is to be noted however that the invention is not limited to the use of these acids, but, according to the subsequent application of the acid albuminate, different acids or mixtures of such can be used as a solvent.

The product I obtain is adapted to be used, for instance, as a nutritive material in the process of making yeast for the purpose of obtaining a much greater quantum of yeast, the acid albuminate being added to the mash in the form of a thin liquid.

I claim:—

The hereindescribed method of obtaining acid albuminate from albuminous substances which consists in digesting the albuminous material with dilute acid, as described, with the addition of yeast and sugar solution, stirring the mass at intervals extending over many hours while undergoing fermentation, and then allowing the mass to undergo sedimentation while at rest.

In testimony whereof I have affixed my signature in presence of two witnesses.

EMANUEL NUSSBAUM.

Witnesses:
WILHELM ZERGER,
ALVESTO S. HOGUE.